United States Patent [19]

Watts et al.

[11] 4,204,852
[45] May 27, 1980

[54] METHOD OF AND APPARATUS FOR PRODUCING A GLASS FIBRE BUNDLE FOR USE IN OPTICAL COMMUNICATIONS SYSTEMS

[75] Inventors: Julian K. Watts; Colin A. Yarker, both of North Wales, England

[73] Assignee: Pilkington Brothers Limited, St. Helens, England

[21] Appl. No.: 923,871

[22] Filed: Jul. 12, 1978

[30] Foreign Application Priority Data

Jul. 13, 1977 [GB] United Kingdom ............... 29470/77

[51] Int. Cl.² ............................................. C03B 37/02
[52] U.S. Cl. ..................................... 65/4 A; 65/11 W; 65/12; 65/13
[58] Field of Search .................... 65/4 A, 11 R, 11 W, 65/13, 374 RM, DIG. 7

[56] References Cited

U.S. PATENT DOCUMENTS

| | | | |
|---|---|---|---|
| 2,514,627 | 7/1950 | Cook | 65/11 W |
| 3,032,813 | 5/1962 | Stalego | 65/11 W |
| 3,268,312 | 8/1966 | Grant | 65/4 A |
| 3,328,143 | 6/1967 | Hicks, Jr. | 65/13 X |

FOREIGN PATENT DOCUMENTS

| | | |
|---|---|---|
| 1261743 | 1/1972 | United Kingdom . |
| 1287421 | 8/1972 | United Kingdom . |
| 1305063 | 1/1973 | United Kingdom . |
| 1352734 | 5/1974 | United Kingdom . |

*Primary Examiner*—Arthur D. Kellogg
*Attorney, Agent, or Firm*—Sughrue, Rothwell, Mion, Zinn and Macpeak

[57] ABSTRACT

To reduce breakage of fibres in optical glass fibre bundles during manufacture caused by formation of loops in the fibre during sheathing, a twist is imparted to the fibre bundle during its formation. The apparatus of the invention includes a furnace, a retaining member for holding clad glass rods in a predetermined spaced relationship one to the other, a guide member adjacent the furnace for maintaining the rods in said spaced relationship, said retaining member being movable with respect to said guide member and connected to a drive means for passing the rods into the furnace, means for drawing the rods into fibres and forming the drawn fibres into a fibre bundle and means for causing relative rotation of the said retaining member and said guide member with respect to said means for drawing the rods into fibres, so as to impart a twist to the fibre bundle as the fibres are drawn from the rods and formed into the bundle.

19 Claims, 1 Drawing Figure

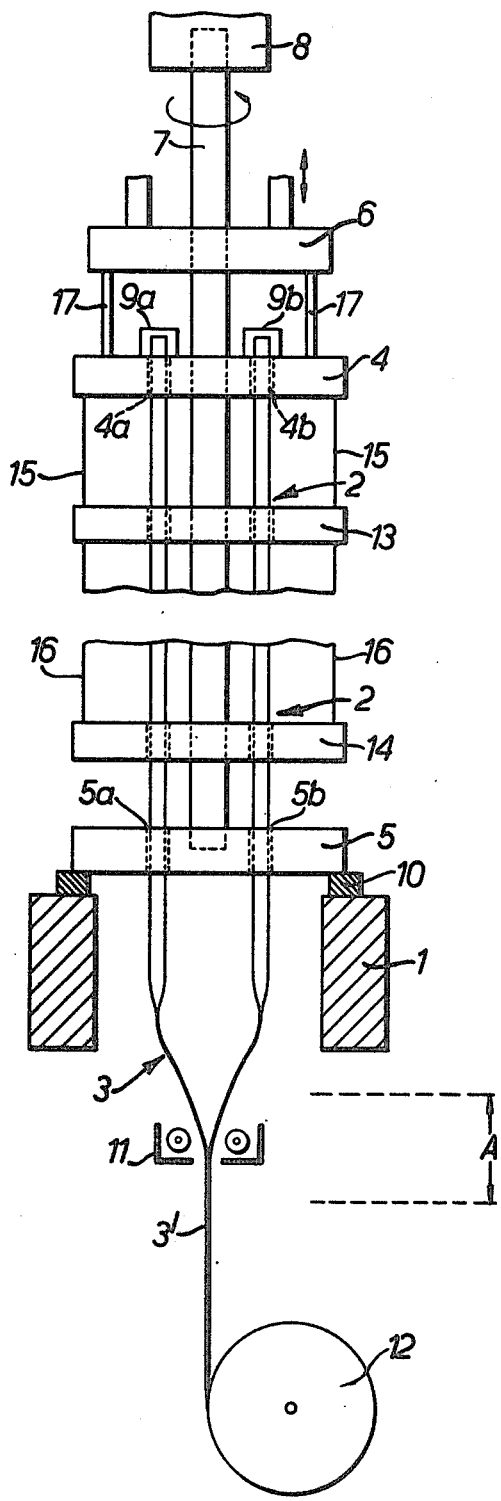

METHOD OF AND APPARATUS FOR PRODUCING A GLASS FIBRE BUNDLE FOR USE IN OPTICAL COMMUNICATIONS SYSTEMS

BACKGROUND OF THE INVENTION

1. Field of the Invention

This invention relates to a method of and apparatus for producing a glass fibre bundle for use in optical communications systems.

2. Description of the Prior Art

As is known, optical fibres for such uses have a light-transmitting glass core with a cladding of a glass of lower refractive index to cause total internal reflection of the light transmitted along the core if it is incident on the interface between the core and cladding.

Optical fibres in the form of single fibre filaments can be used in long distance communications systems, but for medium length applications, such as transmitting signals within an aircraft or a ship, bundles of fibres are preferably used. Such glass fibre bundles are easier to interconnect, in that a reduced accuracy is required in aligning the bundles. Some breakage of individual fibres can also be accepted. Such fibre breakage can occur in use, but they can also occur during the forming of a bundle of glass fibres into a component cable, for example, by extruding a plastics coating or sheath over the fibre bundle.

It has been customary either to marry together fibres to form bundles by re-winding, or to draw a plurality of fibres at one time, sizing them to form a strand or bundle of fibres, which is wound on to a drum. The so-called "pre-form" from which a fibre is drawn is in the form of a clad glass rod, which, for example, can be formed by the process described in our U.K. Pat. No. 1,313,106. Pre-forms in rod form can also be obtained by inserting a glass rod into a tube, and drawing down the composite into a clad glass rod, or by drawing a clad glass rod by a "double crucible" technique. A plurality of such pre-forms can be fed down into a furnace and a mechanical attenuation force applied to each pre-form, so that as it softens it is drawn into a fibre. This can be done, for example, by winding the fibres on to a drum, so that the winding action supplies the mechanical force to attenuate each pre-form into a fibre. Such a winding action produces bundles of fibres with the fibres more or less parallel to one another. The fibres which remain in contact with the winding drum throughout the drawing process are inherently shorter than those which permanently lie on top of other fibers. When unwinding the fibres from the winding drum during further processing (e.g. to provide them with an outer plastics sheath), this slight difference in length reveals itself as a series of loops along the length of the bundle. The application of a size during the fibre drawing process restrains these loops during further processing but does not eliminate them. We believe that these loops contribute to the breakage of the fibres. The greater the number of fibres in the bundle, the greater is the problem created by the loops due to an increase in the difference in length introduced between different fibres in the bundle.

SUMMARY OF THE INVENTION

The invention provides a method of producing a glass fibre bundle for use in optical communications systems by drawing a plurality of clad glass rods into respective fibres and forming the drawn fibres into a fibre bundle, wherein a twist is imparted to the fibre bundle during its formation.

We have found that we can eliminate or substantially reduce the formation of loops by the method of the present invention, and thereby substantially eliminate breakage of fibres during subsequent processing. In the method of the present invention the fibres are no longer laid down in the same position relative to the winding drum and the total length of each fibre is substantially the same. No loops are then formed during further processing.

The preferred twist imparted to the fibre bundle during its formation is from one-half to two turns per meter, but the choice of the twist per meter will, in fact, be affected by the diameter of the winding drum. The twist imparted to the fibre bundle may be as little as one twist per 50 or more meters, or may be in excess of two twists per meter.

In order to carry into effect the invention there must clearly be at least 2, and preferably at least 3, drawn fibres. Fibre bundles having 19, 37, 61, 91 and 127 fibres respectively have been manufactured by the method and apparatus of the present invention, but as regards the maximum number of fibres that can be drawn into a bundle, the upper limit is dictated by the needs of the market-place and practical considerations in providing the drawing equipment. We can provide fibre bundles with up to 500 fibres and no technical problem is seen in providing bundles with as many as 1000 fibres or more. We prefer to manufacture the fibre bundles with a length of at least 500 meters.

Preferably, the twist is imparted to the fibre bundle during its formation by rotating the clad glass rods whilst maintaining means for drawing the rods into respective fibres stationary with respect to rotation. Alternatively, the twist may be imparted to the fibre bundle during its formation by maintaining the clad glass rods stationary with respect to rotation whilst rotating means for drawing the rods into respective fibres.

The invention also provides apparatus for producing a glass fibre bundle for use in optical communications systems by drawing a plurality of clad glass rods into respective fibres and forming the drawn fibres into a fibre bundle, which apparatus comprises a furnace for heating a plurality of clad glass rods to their softening temperature, a retaining member for holding the rods in a predetermined spaced relationship one to the other, a guide member adjacent the furnace for maintaining the rods in said spaced relationship, the retaining member being movable with respect to the guide member and connected to a drive means for passing the rods into the furnace, means for drawing the softened rods into respective fibres and forming the drawn fibres into a fibre bundle, and means for causing relative rotation of the retaining member and the guide member with respect to the means for drawing the fibres, so as to impart a twist to the fibre bundle as the fibres are drawn from the rods and formed into the bundle.

Preferably, each of the retaining member and the guide member is in the form of a plate having a plurality of apertures through which the rods pass. The means for causing rotation may comprise a shaft on which both the retaining member and the guide member are mounted, and drive means for rotating said shaft. The guide member may be mounted on a water-cooled bearing.

The apparatus may include one or more additional movable guide members disposed between the retaining member and the guide member adjacent the furnace.

The rods may be held in the retaining member by means of caps fitted over their ends. Preferably, the means for drawing the softened rods into respective fibres is a rotatable drum on to which is wound the fibre bundle.

The apparatus may have sizing means for applying size to the fibres as they are formed into the fibre bundle.

The present invention is thus particularly useful in providing fibre bundles in which breakage of the fibres is substantially eliminated during the subsequent formation of a component cable. Components can then be produced for sale with all the fibres intact or at least a major proportion intact. This is of importance in selling lengths of component cable which are to be cut into smaller lengths by the end user, as it virtually eliminates the risk of his obtaining lengths of cable with a low number of intact fibres.

BRIEF DESCRIPTION OF THE DRAWINGS

A specific embodiment of the invention will now be described, by way of example, with reference to the accompanying drawing, which is a schematic diagram of an apparatus for carrying out the method of the present invention.

DESCRIPTION OF PREFERRED EMBODIMENTS

The apparatus comprises a furnace 1 for heating a plurality of clad glass rods 2 to their softening temperature so that they may be drawn into fibres 3. The number of rods is shown in the drawing as two, for ease of illustration. The number of rods must be at least 2, and is generally at least 3 or greater, for example the values 19, 37, 61, 91 or 127 have been used.

The apparatus enables a plurality of rods or pre-forms to be drawn each into a single fibre, these single fibres being formed into a bundle of fibres 3' of a desired substantially uniform cross-section.

The rods or pre-forms 2 are in the form of clad glass rods having a core of a glass specially made for conducting light with a low transmission loss, and a glass cladding of a refractive index lower than that of the core glass. We prefer to use rods which have been fabricated by the technique described in our U.K. Pat. No. 1,313,106, though any of the known techniques for making clad glass rods will provide material suitable for use in the present invention. The rods should be of high optical quality and of a uniform dimension throughout their length.

The rods are supported in the correct alignment for drawing by means of a number of rigid plate-like members, namely a retaining member 4, a base guide member 5 and several additional movable guide members, two of which, 13, 14, are shown. The number of additional guide members depends upon the exact construction of the apparatus. The number should be sufficient to maintain the alignment of the rods. The retaining member 4 has apertures 4a, b, through which the rods pass. The base guide member 5, likewise, has corresponding apertures 5a, b, through which the rods pass. Each of the additional guide members again has corresponding apertures through which the rods pass. The numbers of apertures in the retaining member 4, the base guide member 5 and each additional guide member are each equal to the number of rods being drawn.

The member 4 thus holds the rods in a predetermined spaced relationship one to the other. The base guide member 5 is adjacent the furnace 1, and it and the additional guide members 13, 14, maintain the rods in said spaced relationship as they pass into the furnace. The retaining member 4 is rigidly attached by rods 17 to a support 6 which is slidably mounted on a squared shaft 7 the upper end of which is located in a mounting chuck 8 connected to rotational drive means (not shown). Linear drive means (not shown) are provided for moving the support 6 and retaining member 4 up and down on the shaft 7. The squared shaft 7 passes down through the members 6, 4, 13 and 14 and into the base guide member 5 to which it is fastened. The members 6, 4, 13, 14, can thus move up and down on the shaft 7 as the rods are fed into the furnace. Each of the members 13 and 14 is supported by means of wire supports 15 and 16. These supports enable the members to fall freely down the shaft 7 during operation until they reach the base guide member 5 upon which they then become stacked as the drawing operation proceeds. The shaft 7 may, alternatively, be a splined shaft, or the members 6, 4, 13, 14 may be keyed to it. The rods 2 are held in the apertures in the member 4 each by a small cap 9a, b.

The guide member 5 rests on a water-cooled bearing 10. Rotation of the shaft 7 by the drive means connected to the mounting chuck rotates the members 6, 4, 13, 14 and 5, thus rotating the rods 2.

A size applicator 11 may be provided, usually in the form of a roller which rotates in a reservoir of size and over which the drawn fibres 3 are passed as they are formed into the fibre bundle 3'. The fibres are collected into a strand on a winding drum 12.

The fibres 3 are drawn from the glass rods 2 by rotation of the drum 12. The support 6 and retaining member 4 are driven downwards toward the furnace by the linear drive means, so that the glass rods pass through the apertures in the guide members 13, 14, 5 at a rate in accordance with the rate at which fibres are being drawn from the rods by rotation of the drum 12. The drum 12 is rotated at a constant pre-controlled rate so that uniform fibre diameter is obtained. Preferably, the drum rotates relatively rapidly and the rods descend relatively slowly. In some cases the ratio of the circumferential speed of rotation of the drum to the speed of the rod descent might be of the order of 500 to 1, but the ratio can be higher or lower for particular applications. It is possible for the ratio to be up to or in excess of 10,000 to 1, or very low, reaching down to values close to 1 to 1. At the same time as this movement is occurring, the drive shaft 7 is being rotated so as to produce a twist in the fibre bundle being wound on to the drum. The rate of rotation depends on the rate of drawing, but we find it convenient to choose a rate that gives a twist of from one-half to two complete turns per linear meter of the fibre bundle, the precise amount of twist required depending on the circumference of the drum 12. The twist is imparted to the fibre bundle in the region A shown in the figure.

For example, we have found that using rods of diameter approximately 2.5 mm, we can produce fibres of approximately 85 microns diameter, using a drum having a circumference of 2 meters, and that approximately one complete rotation of the bundle can be made for each rotation of the drum.

It will be realised that the support 6 could in some circumstances be dispensed with, and the linear drive means could then act directly on the retaining member 4.

Whilst we prefer to impart a twist to the fibre bundle by rotation of the glass rods as the fibre bundle is drawn, it is also, of course, possible to impart a twist by maintaining the rods stationary and rotating the winding drum.

We claim:

1. A method of producing a bundle of optical glass fibres for use in optical communications systems, comprising the steps of: heating to their softening temperature a plurality of parallel, spaced-apart glass rods which each have a cladding of a glass of lower refractive index, drawing the clad glass rods into respective separate fibres, forming the drawn fibres into a bundle of separable fibres, effecting relative rotation between the plurality of clad glass rods and the formed fibre bundle to impart twist to the bundle, and retaining said twist in the bundle to avoid the formation of loops in individual fibres during subsequent handling of the bundle.

2. A method according to claim 1, wherein the twist imparted to the fibre bundle during its formation is from one-half to two turns per meter.

3. A method according to claim 1, wherein the number of drawn fibres is at least 3.

4. A method according to claim 3, wherein the number of drawn fibres is 19.

5. A method according to claim 3, wherein the number of drawn fibres is 37.

6. A method according to claim 3, wherein the number of drawn fibres is 61.

7. A method according to claim 3, wherein the number of drawn fibres is 91.

8. A method according to claim 3, wherein the number of drawn fibres is 127.

9. A method according to claim 1, wherein the length of the fibre bundle is at least 500 meters.

10. A method according to claim 1, wherein twist is imparted to the fibre bundle during its formation by rotating the plurality of clad glass rods whilst maintaining means for drawing the rods into respective fibres stationary with respect to rotation.

11. A method according to claim 1, wherein twist is imparted to the fibre bundle during its formation by maintaining the plurality of clad glass rods stationary with respect to rotation whilst rotating means for drawing the rods into respective fibres.

12. Apparatus for producing a glass fibre bundle for use in optical communications systems by drawing a plurality of clad glass rods into respective fibres and forming the drawn fibres into a fibre bundle, which apparatus comprises a furnace for heating a plurality of clad glass rods to their softening temperature, a retaining member for holding the rods in a predetermined spaced relationship one to the other, a guide member adjacent the furnace for maintaining the rods in said spaced relationship, the retaining member being movable with respect to the guide member and connected to a drive means for passing the rods into the furnace, means for drawing the softened rods into respective fibres and forming the drawn fibres into a fibre bundle, and means for causing relative rotation of the retaining member and the guide member with respect to the means for drawing the fibres, so as to impart a twist to the fibre bundle as the fibres are drawn from the rods and formed into the bundle.

13. Apparatus according to claim 12, wherein each of the retaining member and the guide member is in the form of a plate having a plurality of apertures through which the rods pass.

14. Apparatus according to claim 12, wherein the means for causing rotation comprises a shaft on which both the retaining member and the guide member are mounted, and drive means for rotating said shaft.

15. Apparatus according to claim 12, wherein the guide member is mounted on a water-cooled bearing.

16. Apparatus according to claim 12, including one or more additional movable guide members disposed between the retaining member and the guide member adjacent the furnace.

17. Apparatus according to claim 12, wherein the rods are held in the retaining member by means of caps fitted over their ends.

18. Apparatus according to claim 12, wherein the means for drawing the softened rods into respective fibres is a rotatable drum on to which is wound the fibre bundle.

19. Apparatus according to claim 12, having sizing means for applying size to the fibres as they are formed into the fibre bundle.

* * * * *